United States Patent
Zhang (10) Patent No.: US 11,283,645 B2
(45) Date of Patent: Mar. 22, 2022

(54) FORWARDING PACKET

(71) Applicant: NEW H3C TECHNOLOGIES CO., LTD., Hangzhou (CN)

(72) Inventor: Yang Zhang, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 279 days.

(21) Appl. No.: 16/618,783

(22) PCT Filed: May 31, 2018

(86) PCT No.: PCT/CN2018/089249
§ 371 (c)(1),
(2) Date: Dec. 2, 2019

(87) PCT Pub. No.: WO2018/219326
PCT Pub. Date: Dec. 6, 2018

(65) Prior Publication Data
US 2020/0136849 A1    Apr. 30, 2020

(30) Foreign Application Priority Data
May 31, 2017   (CN) .......................... 201710398312.6

(51) Int. Cl.
*H04L 29/06* (2006.01)
*H04L 12/28* (2006.01)
(Continued)

(52) U.S. Cl.
CPC ........ *H04L 12/287* (2013.01); *H04L 12/4633* (2013.01); *H04L 12/4666* (2013.01);
(Continued)

(58) Field of Classification Search
CPC ............... H04L 12/287; H04L 12/4633; H04L 12/4666; H04L 61/103; H04L 61/602; H04L 63/101
See application file for complete search history.

(56) References Cited

U.S. PATENT DOCUMENTS

| | | | |
|---|---|---|---|
| 2004/0186878 | A1 | 9/2004 | Yamamoto et al. |
| 2013/0097674 | A1 | 4/2013 | Jindal et al. |
| 2018/0205575 | A1* | 7/2018 | Tian ........................ H04L 69/22 |

FOREIGN PATENT DOCUMENTS

| | | |
|---|---|---|
| CN | 1558626 A | 12/2004 |
| CN | 1866919 A | 11/2006 |

(Continued)

OTHER PUBLICATIONS

Kitada, A. et al., "A Study of Session Management/Service Selection Architecture in Ethernet based Access Networks," Technical Report of IEICE. CS2002-47, vol. 102, No. 256, Jul. 25, 2002, 8 pages.

(Continued)

*Primary Examiner* — Brian P Cox
(74) *Attorney, Agent, or Firm* — McCoy Russell LLP (57) ABSTRACT

Provided are a method and an apparatus for forwarding a packet. Based on an example of the method, in a case of receiving an upstream Q-in-Q protocol packet through a port connected to an access device, an Edge Stream Gateway (ESGW) device forwards the upstream Q-in-Q protocol packet to a Virtual Broadband Remote Access Server (vBRAS) device through a Virtual eXtensible Local Area Network (VXLAN) tunnel between the ESGW device and the vBRAS device; in a case of receiving an upstream Q-in-Q data packet through a port connected to the access device, the ESGW device removes a Q-in-Q tag of the upstream Q-in-Q data packet, determines that a destination Media Access Control (MAC) address of the upstream (Continued)

Ethernet data packet without the Q-in-Q tag is an MAC address of the ESGW device, and performs layer-3 forwarding based on a destination IP address of the upstream Ethernet data packet.

20 Claims, 5 Drawing Sheets

(51) Int. Cl.
    *H04L 12/46*     (2006.01)
    *H04L 61/103*     (2022.01)
    *H04L 101/622*     (2022.01)

(52) U.S. Cl.
    CPC ........ *H04L 61/103* (2013.01); *H04L 61/6022* (2013.01); *H04L 63/101* (2013.01)

(56) References Cited

FOREIGN PATENT DOCUMENTS

| | | |
|---|---|---|
| CN | 101005437 A | 7/2007 |
| CN | 101110764 A | 1/2008 |
| CN | 101257420 A | 9/2008 |
| CN | 103166864 A | 6/2013 |
| CN | 103997460 A | 8/2014 |
| CN | 106533946 A | 3/2017 |
| CN | 106559292 A | 4/2017 |
| CN | 108259298 A | 7/2018 |
| EP | 3328004 A1 | 5/2018 |
| JP | 2018528725 A | 9/2018 |
| WO | 2009021458 A1 | 2/2009 |
| WO | 2011137782 A1 | 11/2011 |
| WO | WO-2017054757 A1 * | 4/2017 ......... H04L 12/4641 |

OTHER PUBLICATIONS

State Intellectual Property Office of the People's Republic of China, Office Action and Search Report Issued in Application No. 201710398312.6, dated Sep. 7, 2020, 8 pages. (Submitted with Machine Translation).

ISA State Intellectual Property Office of the People's Republic of China, Written Opinion of the International Searching Authority Issued in Application No. PCT/CN2018/089249, dated Aug. 7, 2018, WIPO, 8 pages.

European Patent Office, Extended European Search Report Issued in Application No. 18809671.3, dated May 6, 2020, Germany, 10 pages.

State Intellectual Property Office of the People's Republic of China, Office Action and Search Report Issued in Application No. 201710398312.6, dated May 8, 2020, 19 pages. (Submitted with Machine Translation).

Shujun, H. et al., "Discussion on China Mobile's Evolution of Fixed-Line Network Architecture Based on SDN and NFV," China Mobile Research Institute, Feb. 23, 2017, 14 pages.

ISA State Intellectual Property Office of the People's Republic of China, International Search Report Issued in Application No. PCT/CN2018/089249, dated Aug. 7, 2018, WIPO, 4 pages.

State Intellectual Property Office of the People's Republic of China, Office Action and Search Report Issued in Application No. 201710398312.6, dated Sep. 3, 2019, 17 pages. (Submitted with Partial Translation).

European Patent Office, Office Action Issued in Application No. 18809671.3, dated Dec. 22, 2021, Germany, 9 pages.

\* cited by examiner

FORWARDING PACKET

CROSS-REFERENCE TO RELATED APPLICATIONS

The present application is a U.S. National Phase of International Patent Application Serial No. PCT/CN2018/089249 entitled "PACKET FORWARDING," filed on May 31, 2018. International Patent Application Serial No. PCT/CN2018/089249 claims priority to Chinese Patent Application No. 201710398312.6, filed on May 31, 2017. The entire contents of each of the above-cited applications are hereby incorporated by reference in their entirety for all purposes.

BACKGROUND

The present disclosure relates to forwarding a packet in network communication.

With development of Software Defined Network (SDN) technology and Network Function Virtualization (NFV) technology, the key to improve future metropolitan area network and access network is to construct a comprehensive multi-service access edge for a multi-service convergence. A Broadband Remote Access Server (BRAS) device, being a core of the access edge, will be emphasized during reformation of the comprehensive multi-service access edge. One of the reformation solutions relating the BRAS for the comprehensive multi-service access edge is to implement the virtualization of the BRAS.

However, it is found in practice that, in an existing implementation solution of BRAS virtualization, both a protocol packet and a data packet interacted between a user side and a network side are to be forwarded through a Virtual BRAS (vBRAS) device, resulting in excessive load of the vBRAS device.

DETAILED DESCRIPTION OF THE EMBODIMENTS

To enable those skilled in the art to better understand the technical solutions in an examples of the present disclosure and make the above objectives, features, and advantages of the example of the present disclosure more apparent and understandable, the technical solutions in an example of the present disclosure will be further described in detail below in combination with the accompanying drawings.

Figure 1:
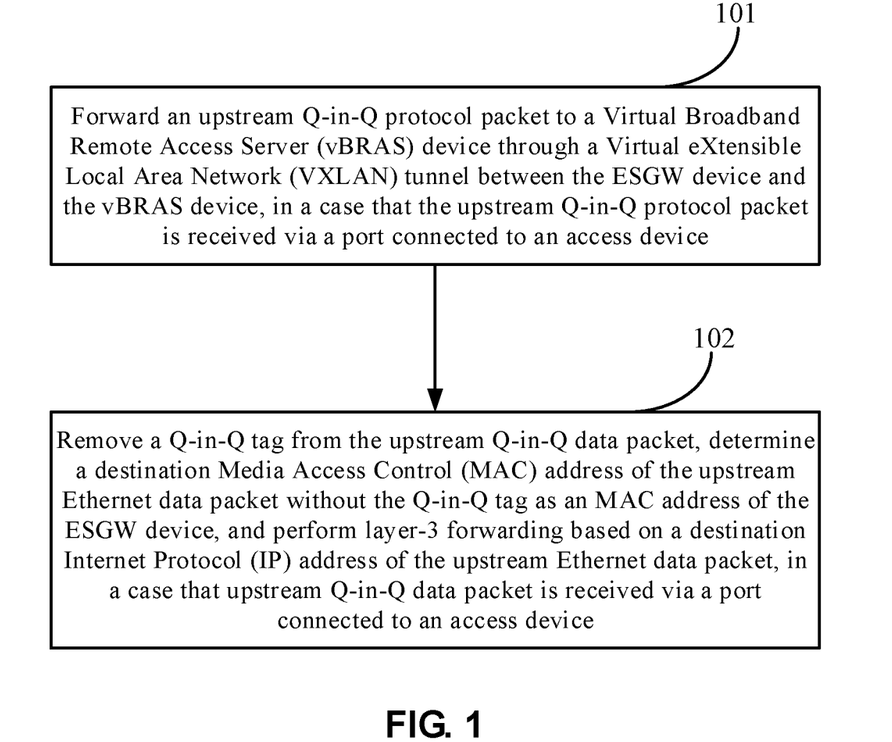
FIG. 1 is a schematic flowchart illustrating a method of forwarding a packet based on an example of the present disclosure.

FIG. 1 is a schematic flowchart illustrating a method of forwarding a packet based on an example of the present disclosure, where the method of forwarding a packet may be applied to an Edge Stream Gateway (ESGW) device. As shown in FIG. 1, the method of forwarding a packet may include the following blocks.

At block 101, an ESGW device may forward an upstream Q-in-Q protocol packet to a Virtual Broadband Remote Access Server (vBRAS) device through a Virtual eXtensible Local Area Network (VXLAN) tunnel between the ESGW device and the vBRAS device, in a case that the upstream Q-in-Q protocol packet is received via a port connected to an access device.

At block 102, the ESGW device may remove a Q-in-Q tag from the upstream Q-in-Q data packet, determine a destination Media Access Control (MAC) address of the upstream Ethernet data packet without the Q-in-Q tag as an MAC address of the ESGW device, and perform layer-3 forwarding based on a destination Internet Protocol (IP) address of the upstream Ethernet data packet, in a case that an upstream Q-in-Q data packet is received via the port connected to the access device.

Based on an existing implementation solution of BRAS virtualization, the vBRAS device may integrate a function of a gateway device, and both the protocol packet and the data packet interacted between the user side and the network side are to be forwarded through the vBRAS device, resulting in excessive load of the vBRAS device. Therefore, in the present disclosure, to reduce the load of the vBRAS device, the function of a gateway device may be separated from the vBRAS device so that the data packet interaction between the user side and the network side may be performed by a dedicated gateway device. The vBRAS device without the function of the gateway device may be specially used to forward and process a protocol packet, and the data packet may be no longer forwarded through the vBRAS device.

In an example of the present disclosure, to achieve the above objective, an ESGW device may be deployed in a network to connect an Edge Data Center (EDC for short) with an external network.

Correspondingly, in an example of the present disclosure, in the case of receiving an upstream Q-in-Q protocol packet, i.e., a user-side protocol packet, via a port connected to an access device, the ESGW device may forward the upstream Q-in-Q protocol packet to the vBRAS device for processing. To this end, the ESGW device may forward the upstream Q-in-Q protocol packet to the vBRAS device through a VXLAN tunnel between the ESGW device and the vBRAS device.

In a case of receiving an upstream Q-in-Q data packet, i.e., a user-side data packet, the ESGW device may not forward the upstream Q-in-Q data packet to the vBRAS device, but may directly forward the data packet locally. To this end, the ESGW device may remove a Q-in-Q tag of the upstream Q-in-Q data packet and determine whether a destination MAC address of the upstream Ethernet data packet without the Q-in-Q tag is an MAC address of the ESGW device; if yes, the ESGW device may perform layer-3 forwarding based on a destination IP address of the upstream Ethernet data packet without the Q-in-Q tag.

To help those skilled in the art to better understand the technical solutions in the examples of the present disclosure, the technical solutions in the example of the present disclosure will be described below in conjunction with specific application scenarios.

Figure 2A:
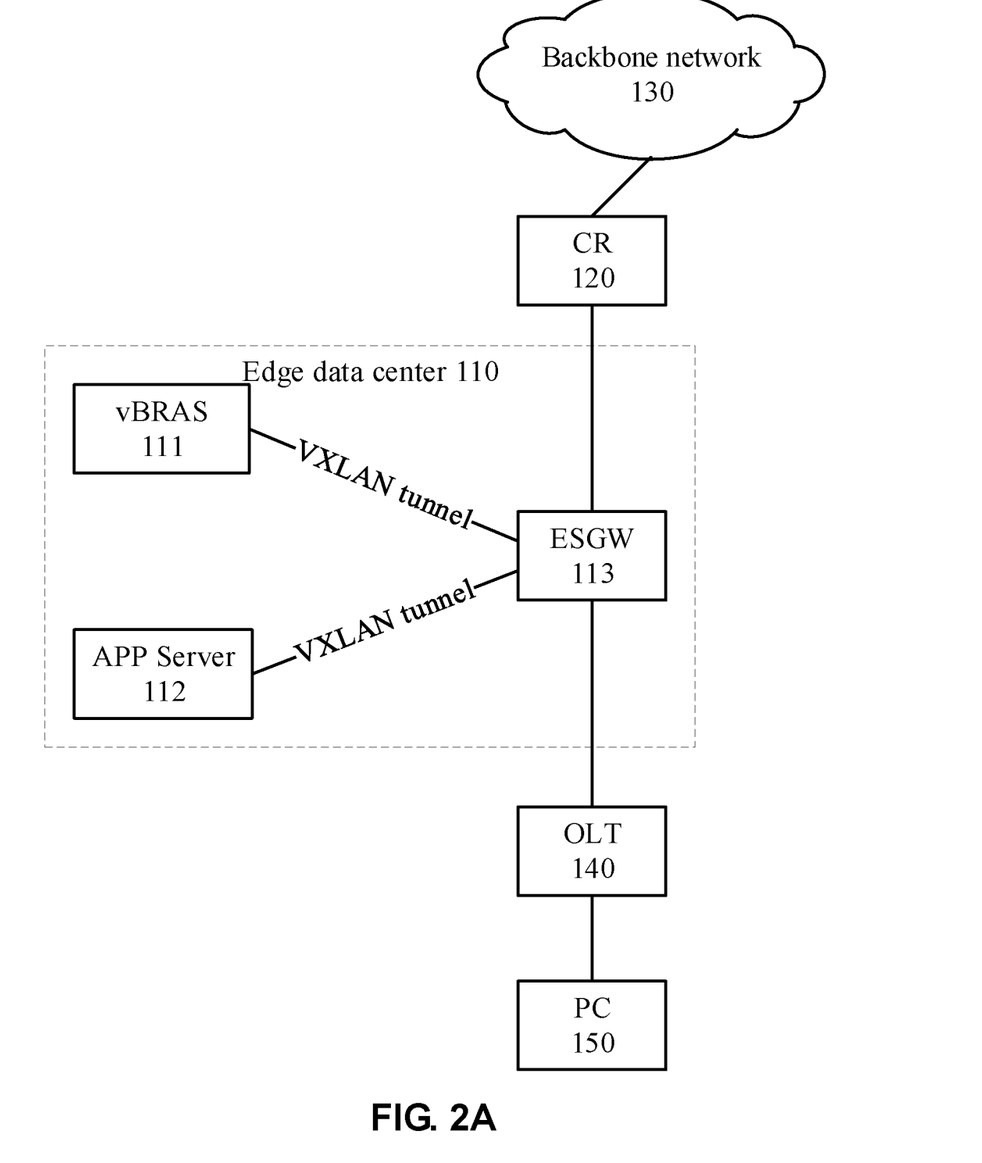
FIG. 2A is a schematic diagram illustrating a structure of a specific application scenario based on an example of the present disclosure.

FIG. 2A is a schematic diagram illustrating a structure of a specific application scenario based on an example of the present disclosure. As shown in FIG. 2A, in the application scenario, a vBRAS device 111, an APP server 112 and an ESGW device 113 may be deployed in an edge data center 110. A VXLAN tunnel may be established between the vBRAS device 111 and an ESGW device 113, and between the APP server 112 and the ESGW device 113, respectively. The ESGW device 113 may be in layer-3 intercommunication with a Core Router (CR) 120 so as to access a backbone network 130. A Personal Computer (PC) 150 may access the ESGW device 113 via an Optical Line Terminal (OLT) 140.

Based on the application scenario shown in FIG. 2A, the implementation principle of the solution of forwarding a packet based on an example of the present disclosure is as follows.

I. Configuration Phase

The ESGW device 113 may configure an Access Control List (ACL) entry for a protocol packet from the PC 150, where the priority of the ACL entry is higher than the priority of an MAC entry.

Take a Dynamic Host Configuration Protocol (DHCP) packet and an Address Resolution Protocol (ARP) packet as examples of the protocol packet, the format of the ACL entry may be as shown in Table 1:

TABLE 1

| Match field | Instruction |
| --- | --- |
| An ingress port of a packet is a port via which the ESGW device is connected to the OLT device; the packet carries a DHCP protocol feature field | Send the packet through a tunnel port of a VXLAN tunnel via which the ESGW device is connected to the vBRAS device |
| An ingress port of a packet is a port via which the ESGW device is connected to the OLT device; the packet carries an ARP protocol feature field | Send the packet through a tunnel port of a VXLAN tunnel via which the ESGW device is connected to the vBRAS device |
| . . . | . . . |

In Table 1, an ingress port of a match field of each ACL entry is a port connected to an OLT serving as an access device. The match field of each ACL entry includes a packet type identifier.

A virtual interface on the vBRAS device 111 and a virtual interface on the ESGW device 113 may be configured with a same MAC address.

II. Protocol Packet Interaction

Figure 2B:
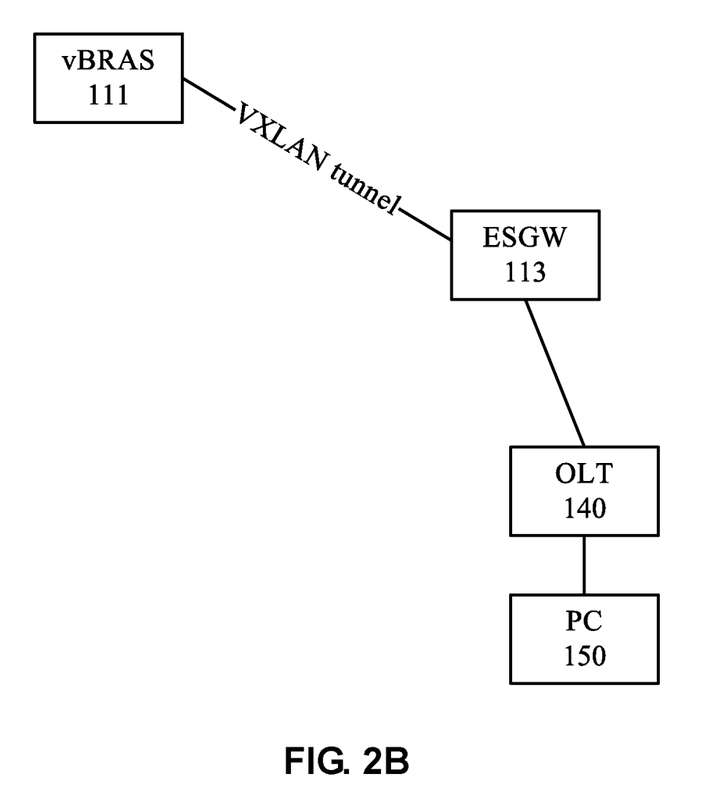
FIG. 2B is a schematic diagram illustrating a structure of a specific application scenario based on an example of the present disclosure.

As shown in FIG. 2B, in the example, the ESGW device 113 may process the Q-in-Q protocol packet as a gateway in a manner as follows.

When the PC 150 goes online, the PC 150 may first send a DHCP request packet to request a DHCP server to allocate an IP address. The OLT 140 may add a Q-in-Q tag to the DHCP request packet and broadcast the DHCP request packet with the Q-in-Q tag. The ESGW device 113 may perform MAC address learning based on a source MAC address of the DHCP request packet with the Q-in-Q tag, i.e., a MAC address of the PC 150, and a receiving port, i.e., a port via which the ESGW device 113 is connected to the OLT 140.

The ESGW device 113 may receive the DHCP request packet with the Q-in-Q tag, search for a matching ACL entry based on an ingress port and a DCHP protocol feature field, and perform VXLAN encapsulation on the DHCP request packet with the Q-in-Q tag based on the instruction of the matching ACL entry. The ESGW device 113 may send the VXLAN-encapsulated DHCP request packet with the Q-in-Q tag to the vBRAS device 111 through the VXLAN tunnel connected to the vBRAS device 111.

The vBRAS device 111 already enables a function of a DHCP server. In the case of receiving the VXLAN-encapsulated DHCP request packet with the Q-in-Q tag, the vBRAS device 111 may remove the VXLAN encapsulation, perform MAC address learning based on the source MAC address and the VXLAN tunnel, allocate an IP address to the PC 150, and reply with a DHCP response packet with a Q-in-Q tag. Based on a VXLAN tunnel corresponding to a destination MAC address of the DHCP response packet with the Q-in-Q tag, the vBRAS device 111 may perform VXLAN encapsulation on the DHCP response packet with the Q-in-Q tag and send the VXLAN packet to the ESGW device 113.

In the case of receiving the VXLAN-encapsulated DHCP response packet with the Q-in-Q tag, the ESGW device 113 may first remove the VXLAN encapsulation, and forward the response packet to the OLT 140 serving as an access device based on the destination MAC address of the DHCP response packet with the Q-in-Q tag. The OLT 140 may remove the Q-in-Q tag and then forward the DHCP response packet to the PC 150.

The PC 150 may acquire an IP address allocated to the PC 150 based on the DHCP response packet. Thereafter, the PC 150 may send an authentication packet carrying its own IP address and MAC address to the OLT 140. The OLT 140 may add a Q-in-Q tag to the authentication packet and send the authentication packet with the Q-in-Q tag to the ESGW device 113. After receiving the authentication packet with the Q-in-Q tag, the ESGW device 113 may search for a matching ACL entry based on an ingress port and a protocol feature field of the authentication packet, and perform VXLAN encapsulation on the authentication packet with the Q-in-Q tag based on the instruction of the matching ACL entry. The ESGW device 113 may send the VXLAN-encapsulated authentication packet with the Q-in-Q tag to the vBRAS device 111 through a VXLAN tunnel connected to the vBRAS device 111.

After receiving the VXLAN-encapsulated authentication packet with the Q-in-Q tag, the vBRAS device 111 may acquire the authentication packet by removing the VXLAN encapsulation and the Q-in-Q tag. Then, the vBRAS device 111 may send the authentication packet to an AAA server (not shown) so that the AAA server can authenticate the PC 150 based on the authentication packet. After confirming that the PC 150 is successfully authenticated, the AAA server may generate and send a successful authentication packet to the vBRAS device 111.

After receiving the successful authentication packet, the vBRAS device 111 may obtain a VXLAN-encapsulated successful authentication packet with a Q-in-Q tag by adding the Q-in-Q tag to the successful authentication packet and performing VXLAN encapsulation. Thereafter, the vBRAS device 111 may send the VXLAN-encapsulated successful authentication packet with the Q-in-Q tag to the ESGW device 113 through a VXLAN tunnel corresponding to a destination MAC address of the packet, i.e., a VXLAN tunnel connected to the ESGW device 113.

After receiving the VXLAN-encapsulated successful authentication packet with the Q-in-Q tag, the ESGW device 113 may remove the VXLAN encapsulation and perform layer-2 forwarding based on the destination MAC address of the successful authentication packet with a Q-in-Q tag. Specifically, the ESGW device 113 may forward the packet to the OLT 140 through an egress port corresponding to the destination MAC address of the successful authentication packet with the Q-in-Q tag so that the OLT 140 may remove the Q-in-Q tag and then forward the successful authentication packet to the PC 150.

In this case, after being successfully authenticated, the PC 150 may start network communication by using the allocated IP address. The vBRAS device 111 may send the IP address of the PC 150, the destination MAC address being the MAC address of the PC 150, an egress port reaching the IP address of the PC 150 being a port via which the ESGW device is connected to the OLT device, and Q-in-Q tags of the PC to the ESGW device 113, where the Q-in-Q tags may be Q-in-Q tags carried in the DHCP request packet and the authentication request packet of the PC 150, i.e., two 802.1Q tags.

When receiving the IP address of the PC 150, the destination MAC address being the MAC address of the PC 150, the egress port reaching the IP address of the PC 150 being the port via which the ESGW device is connected to the OLT device, and the Q-in-Q tags of the PC 150 from the vBRAS device 111, the ESGW device 113 may generate an ARP entry of the IP address of the PC 150, where the ARP entry of the IP address of the PC 150 records that the IP address of the PC 150 corresponds to the MAC address of the PC 150, the egress port reaching the PC 150 being the port via which the ESGW device 113 is connected to the OLT device 140, and index information of the Q-in-Q tags of the PC 150.

In case of performing data access across gateways, the PC 150 may send an ARP request packet to request an IP address of a gateway device. A target IP address of the ARP request packet from the PC 150 is an IP address of the vBRAS device 111. The OLT 140 may add a Q-in-Q tag to the ARP request packet and broadcast the ARP request packet with the Q-in-Q tag. The ESGW device 113 may receive the ARP request packet with the Q-in-Q tag, and search for a matching ACL entry based on an ingress port and an ARP protocol feature field, and obtain a VXLAN-encapsulated ARP request packet with a Q-in-Q tag by performing VXLAN encapsulation on the ARP request packet with the Q-in-Q tag based on the instruction of the matching ACL entry. The ESGW device 113 may send the VXLAN-encapsulated ARP request packet with the Q-in-Q tag to the vBRAS device 111 through a VXLAN tunnel connected to the vBRAS device 111.

The vBRAS device 111 may receive the VXLAN-encapsulated ARP request packet with the Q-in-Q tag and remove the VXLAN encapsulation. The vBRAS device 111 may perform protocol processing based on the ARP request packet with the Q-in-Q tag to generate an ARP response packet with a Q-in-Q tag for replying to the ARP request packet; where a sender IP address of the ARP response packet is an IP address of the vBRAS device 111, and a sender MAC address of the ARP response packet is an MAC address of a virtual interface on the vBRAS device 111; the vBRAS device 111 may perform VXLAN encapsulation on the ARP response packet with the Q-in-Q tag based on a VXLAN tunnel corresponding to a destination MAC address of the ARP response packet with the Q-in-Q tag, i.e., an MAC address of the PC 150, so as to obtain a VXLAN-encapsulated ARP response packet with a Q-in-Q tag. The vBRAS device 113 may send the VXLAN-encapsulated ARP response packet with the Q-in-Q tag to the ESGW device 111.

The ESGW device may obtain the ARP response packet with the Q-in-Q tag by removing the VXLAN encapsulation. Then, the ESGW device 113 may send the ARP response packet with the Q-in-Q tag to the OLT 140 based on an egress port corresponding to the destination MAC address of the ARP response packet with the Q-in-Q tag, so that the OLT 140 may remove the Q-in-Q tag and then forward the ARP response packet to the PC 150. Therefore, the PC 150 may learn the MAC address of the virtual interface of the ESGW device 111 based on the sender MAC address of the ARP response packet.

III. Data Packet Interaction

Figure 2C:
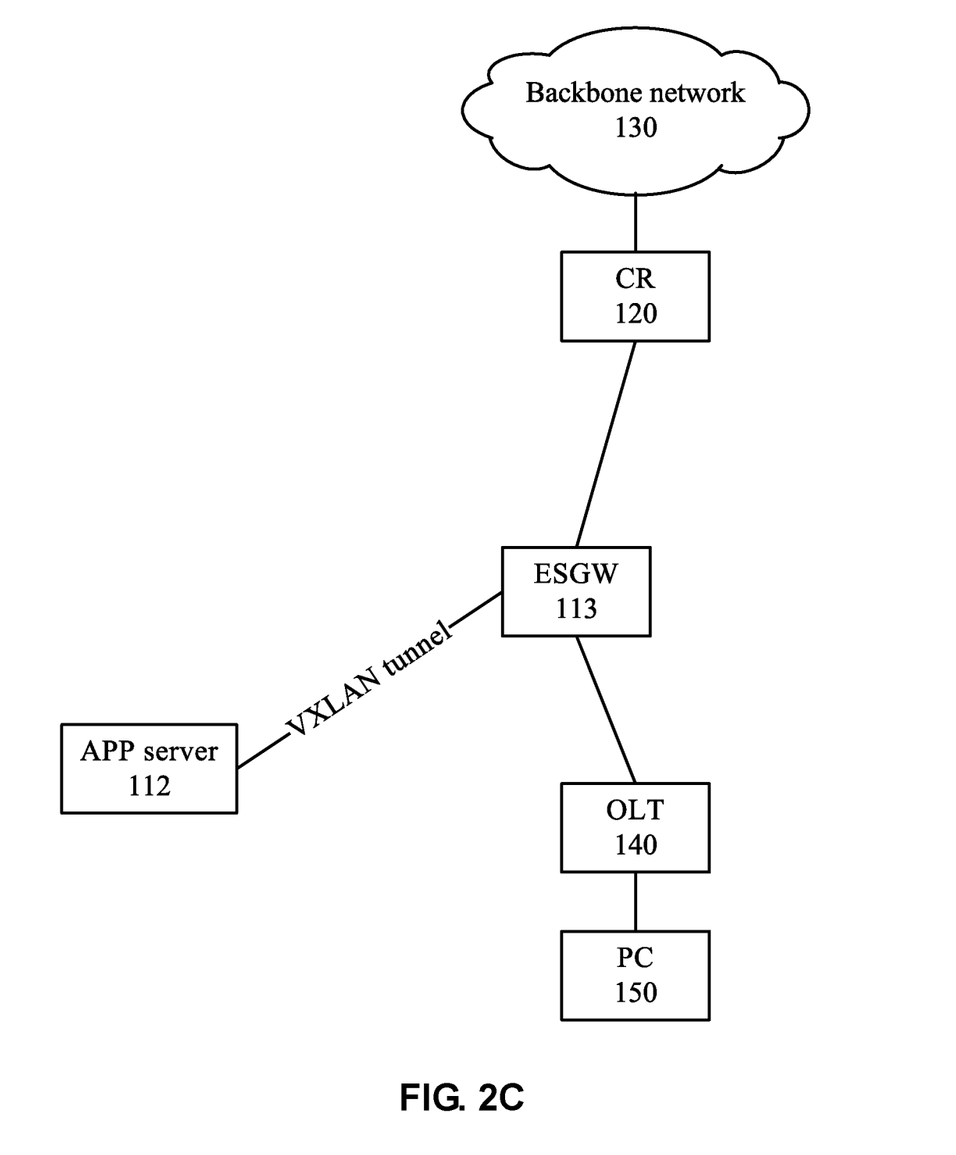
FIG. 2C is a schematic diagram illustrating a structure of a specific application scenario based on an example of the present disclosure.

As shown in FIG. 2C, in this example, data packet interaction between the PC 150 and the APP server 112 and between the PC 150 and the CR 120 may be performed as follows.

PC Sends a Data Packet to APP Server

The ESGW device 113 may receive an upstream Q-in-Q data packet through a port connected to the OLT 140, remove a Q-in-Q tag of the upstream Q-in-Q data packet, and determine that a destination MAC address of the upstream Ethernet data packet without the Q-in-Q tag is an MAC address of the ESGW device 113. Then, the ESGW device 113 may remove the destination MAC address and a source MAC address of the upstream Ethernet data packet.

The ESGW device 113 may search for a matching ARP entry based on a destination IP address of the upstream Ethernet data packet, and obtain an MAC address corresponding to the destination IP address and a VXLAN tunnel as the VXLAN tunnel between the ESGW device 113 and the APP server 112. The ESGW device 113 and the APP server 112 may forward an ARP protocol packet through an existing VXLAN tunnel therebetween and learn an ARP entry from each other, which is not described herein.

The ESGW device 113 may re-encapsulate the upstream Ethernet data packet by using the MAC address of the virtual interface as a source MAC address and an MAC address corresponding to an inner-layer destination IP address of the above upstream Ethernet data packet as a destination MAC address. The ESGW device 113 may encapsulate the re-encapsulated upstream Ethernet data packet into an upstream VXLAN-encapsulated Ethernet data packet based on a VXLAN tunnel corresponding to the inner-layer destination IP address of the re-encapsulated upstream Ethernet data packet, and send the upstream VXLAN-encapsulated Ethernet data packet to the APP server 112 through an egress port of the VXLAN tunnel.

The APP server 112 may receive the upstream VXLAN-encapsulated Ethernet data packet, and learn an MAC address entry based on an inner-layer source MAC address and the VXLAN tunnel. The APP server 112 will subsequently send the data packet sent to the PC 150 to the ESGW device 113 based on the learned MAC address entry for layer-3 forwarding.

PC Sends a Data Packet to CR

The ESGW device 113 may receive the upstream Q-in-Q data packet through a port connected to the OLT 140, remove the Q-in-Q tag of the upstream Q-in-Q data packet and determine that a destination MAC address of the upstream Ethernet data packet without the Q-in-Q tag is an MAC address of the ESGW device 113. Then, the ESGW device 113 may remove the destination MAC address and a source MAC address of the upstream Ethernet data packet, search for a next-hop IP address of the destination IP address, and obtain an MAC address and an egress port (i.e., a port via which the ESGW device 113 is connected to the CR 120) corresponding to the next-hop IP address based on the ARP entry matching the next-hop IP address.

The upstream Ethernet data packet may be re-encapsulated by using the MAC address of the virtual interface of the ESGW device 113 as a source MAC address and the MAC address corresponding to the next-hop IP address as a destination MAC address. That is, the inner-layer IP packet of the original upstream Ethernet packet may be encapsulated with a new Ethernet header. The ESGW device 113 may send the re-encapsulated upstream Ethernet data packet to the CR 120 through the egress port corresponding to the next-hop IP address.

In this way, the CR 120 may receive the upstream Ethernet data packet, and learn an MAC address entry based on the source MAC address and the receiving port. The CR 120 may subsequently send the data packet sent to the PC 150 to the ESGW device 113 based on the learned MAC address entry for layer-3 forwarding.

APP Server Sends a Data Packet to PC

The ESGW device 113 may receive a downstream VXLAN-encapsulated Ethernet data packet through a VXLAN tunnel between the ESGW device 113 and the APP server 112, and remove the VXLAN encapsulation. The ESGW device 113 may determine that a destination MAC address of the downstream Ethernet data packet without the VXLAN encapsulation is an MAC address of the ESGW device 113, and decapsulate the downstream Ethernet data packet without the VXLAN encapsulation into a downstream IP data packet. That is, an Ethernet header of the downstream Ethernet data packet without the VXLAN encapsulation may be removed.

The ESGW device 113 may determine a matching ARP entry of the IP address of the PC 150 based on a destination IP address of the downstream IP data packet. The ESGW device 113 may encapsulate the decapsulated IP data packet into a downstream Q-in-Q data packet based on the matching ARP entry of the IP address of the PC 150. For example, the ESGW device 113 may determine index information of a Q-in-Q tag based on the matching ARP entry, and determine a corresponding Q-in-Q tag based on the index information of the Q-in-Q tag, so as to perform Q-in-Q encapsulation on the downstream IP data packet by using the Q-in-Q tag.

The ESGW device 113 may send the downstream Q-in-Q data packet to the OLT 140 through an egress port of the ARP entry of the IP address of the PC 150, i.e. a port via which the ESGW device 113 is connected to the OLT 140.

After removing the Q-in-Q tag, the OLT 140 may send the downstream Ethernet data packet to the PC 150.

CR Sends a Data Packet to PC

The ESGW device 113 may receive a downstream Ethernet data packet from the CR 120, determine that a destination MAC address of the downstream Ethernet data packet is an MAC address of the ESGW device 113, and decapsulate the downstream Ethernet data packet into a downstream IP data packet. The ESGW device 113 may determine a matching ARP entry of the IP address of the PC 150 based on a destination IP address of the downstream IP data packet, and the egress port included in the matching ARP entry is a port connecting the ESGW device 113 with the OLT 140 and reaching the PC 150. The ESGW device 113 may encapsulate the downstream IP data packet into a downstream Q-in-Q data packet based on the ARP entry of the IP address of the PC 150; and send the downstream Q-in-Q data packet to the OLT 140 through an egress port of the ARP entry of the IP address of the PC, i.e., a port via which the ESGW device 113 is connected to the OLT 140.

In this way, the OLT 140 may send to the PC 150 the downstream Ethernet data packet obtained by removing the Q-in-Q encapsulation from the downstream Q-in-Q data packet.

As may be seen from the above description, in the technical solutions of the examples of the present disclosure, in a case of receiving an upstream Q-in-Q protocol packet through a port connected to an access device, an ESGW device may forward the upstream Q-in-Q protocol packet to a vBRAS device through a VXLAN tunnel between the ESGW device and the vBRAS device; in the case of receiving the upstream Q-in-Q data packet through a port connected to the access device, the ESGW device may remove a Q-in-Q tag of the upstream Q-in-Q data packet, determine that a destination MAC address of the upstream Ethernet data packet without the Q-in-Q tag is an MAC address of the ESGW device, and perform layer-3 forwarding based on the destination IP address of the upstream Ethernet data packet so as to separate protocol packets and data packets at a user side and reduce the load of the vBRAS device.

The above descriptions are made to the method provided based on the present disclosure. An apparatus in the present disclosure will be described below.

Figure 3:
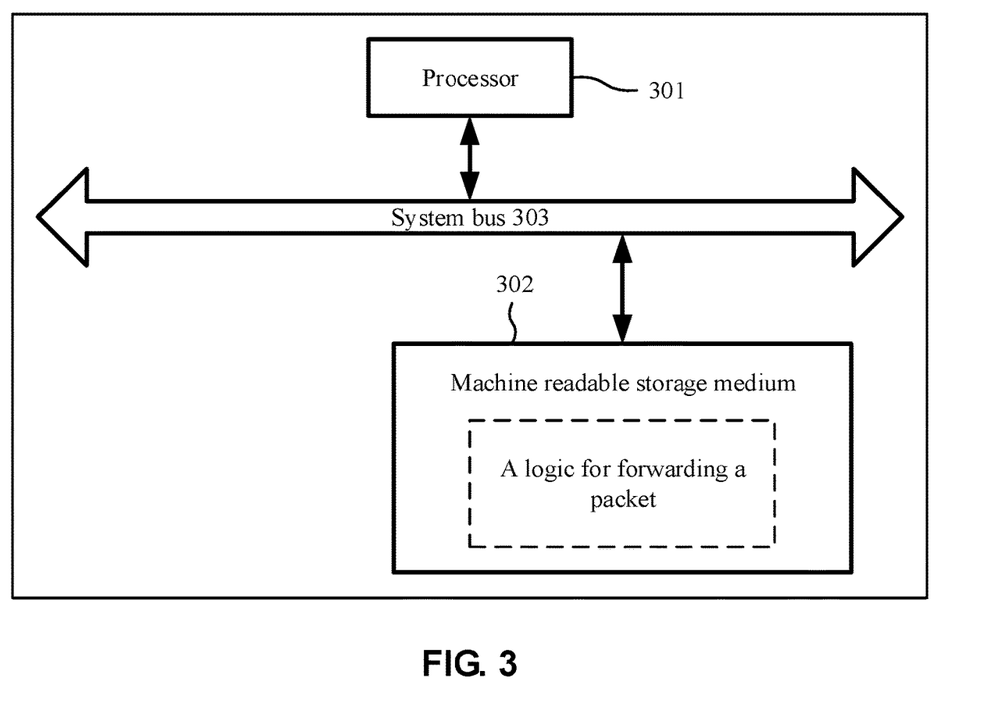
FIG. 3 is a schematic diagram illustrating a hardware structure of an apparatus for forwarding a packet based on an example of the present disclosure.

FIG. 3 is a schematic diagram illustrating a hardware structure of an apparatus for forwarding a packet based on an example of the present disclosure. The apparatus for forwarding a packet may be applied to an Edge Stream Gateway (ESGW) device. As shown in FIG. 3, the apparatus for forwarding a packet may include a processor 301 and a machine-readable storage medium 302 storing machine-executable instructions. The processor 301 may communicate with the machine-readable storage medium 302 via a system bus 303. Moreover, by reading and executing the machine-executable instructions corresponding to a control logic for forwarding a packet in the machine-readable storage medium 302, the processor 301 may be caused to execute the above method of forwarding a packet.

The machine-readable storage medium 302 mentioned herein may be any of electronic, magnetic, optical, or other physical storage devices and may contain or store information such as executable instructions, data, etc. For example, the machine-readable storage medium may be a volatile memory, a non-volatile memory, or other type of storage medium. For example, the machine readable storage medium may be: a Random Access Memory (RAM), a flash memory, a storage drive (e.g. hard disk drive), a solid state hard disk, a storage disk (e.g., optical disk, Digital Video Disk (DVD)), or a combination thereof.

Figure 4:
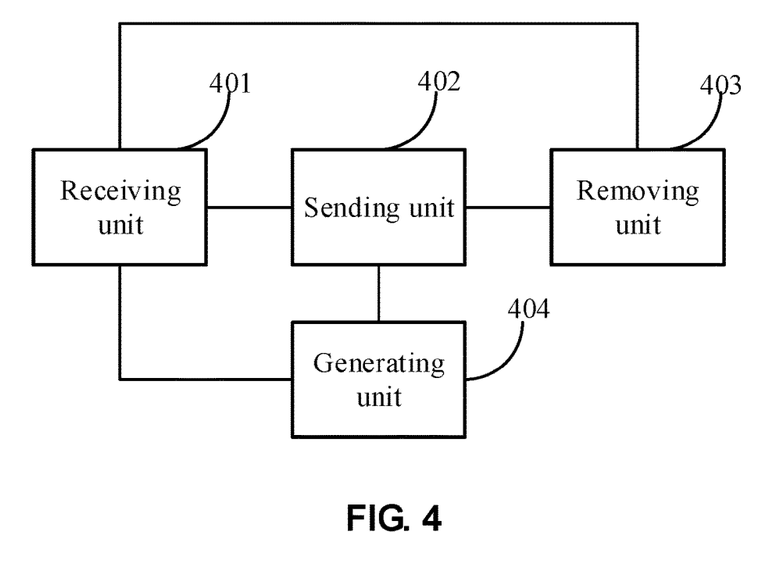
FIG. 4 is a functional structure diagram illustrating a control logic for forwarding a packet based on an example of the present disclosure.

As shown in FIG. 4, the above control logic for forwarding a packet may functionally include a receiving unit 401, a sending unit 402, and a removing unit 403.

The receiving unit 401 is configured to receive an upstream Q-in-Q protocol packet and an upstream Q-in-Q data packet through a port connected to an access device.

The sending unit 402 is configured to forward the upstream Q-in-Q protocol packet to a virtual Broadband Remote Access Server (vBRAS) device through a Virtual eXtensible Local Area Network (VXLAN) tunnel between the ESGW device and the vBRAS device when the receiving unit 401 receives the upstream Q-in-Q protocol packet through the port connected to the access device.

The removing unit 403 is configured to remove a Q-in-Q tag of an upstream Q-in-Q data packet when the receiving unit 401 receives the upstream Q-in-Q data packet through a port connected to the access device.

The sending unit 402 is further configured to perform layer-3 forwarding based on a destination IP address of the upstream Ethernet data packet when a destination MAC address of the upstream Ethernet data packet without the Q-in-Q tag is determined to be an MAC address of the ESGW device.

In an example, the sending unit 402 is configured to query an ACL based on the upstream Q-in-Q protocol packet; where the ACL is provided with a plurality of ACL entries, an ingress port of a match field of each of the ACL entries is a port connected to an access device, the match field of each of the ACL entries includes a packet type identifier; an instruction of each of the ACL entries is that: sending a packet through a tunnel port of a VXLAN tunnel connected to the vBRAS device, and the priorities of the ACL entries are higher than the priority of an MAC entry.

The sending unit 402 is further configured to encapsulate the upstream Q-in-Q protocol packet into an upstream VXLAN-encapsulated Q-in-Q protocol packet by using a VXLAN tunnel through which the ESGW device is connected to the vBRAS device based on an instruction of an ACL entry matching the upstream Q-in-Q protocol packet, and send the upstream VXLAN-encapsulated Q-in-Q protocol packet through an egress port of the VXLAN tunnel through which the ESGW device is connected to the vBRAS device.

In another example, the removing unit 403 is further configured to remove the destination MAC address and the source MAC address of the upstream Ethernet data packet.

The sending unit 402 is further configured to obtain an MAC address and a VXLAN tunnel corresponding to the destination IP address by searching for an ARP entry matching the destination IP address; re-encapsulate the upstream Ethernet data packet by using the MAC address of the ESGW device as a source MAC address and an MAC address corresponding to the destination IP address as a destination MAC address, and encapsulate the re-encapsulated upstream Ethernet data packet into an upstream VXLAN-encapsulated Ethernet data packet based on the VXLAN tunnel corresponding to the destination IP address; and send the VXLAN-encapsulated Ethernet data packet through the egress port of the VXLAN tunnel corresponding to the destination IP address.

In another example, the removing unit 403 is further configured to remove the destination MAC address and the source MAC address of the upstream Ethernet data packet.

In still another example, the sending unit 402 is further configured to search for a next-hop IP address of the destination IP address; obtain an MAC address and an egress port corresponding to the next-hop IP address by searching for an ARP entry matching the next-hop IP address; re-encapsulate the upstream Ethernet data packet by using the MAC address of the ESGW device as a source MAC address and the MAC address corresponding to the next-hop IP address as a destination MAC address, and send the packet through an egress port corresponding to the next-hop IP address.

In an example, the receiving unit 401 is further configured to receive an IP address of a target user terminal, an MAC address of the target user terminal, an egress port reaching the target user terminal being a port connected to an access device, and a Q-in-Q tag of the target user terminal from the vBRAS device.

In this case, the above control logic for forwarding a packet may further include a generating unit 404 configured to generate an ARP entry of an IP address of the target user terminal; where the ARP entry of the IP address of the target user terminal records that the IP address of the target user terminal corresponds to the MAC address of the target user terminal, the port connected to the access device, and the index information of the Q-in-Q tag of the target user terminal.

Correspondingly, the sending unit 402 is further configured to decapsulate a downstream Ethernet data packet into a downstream IP data packet when the receiving unit 401 receives the downstream Ethernet data packet and a destination MAC address of the received downstream Ethernet data packet is determined to be an MAC address of the ESGW device; determine a matching ARP entry of the IP address of the target user terminal based on the destination IP address of the downstream IP data packet; encapsulate the downstream IP data packet into a downstream Q-in-Q data packet based on the ARP entry of the IP address of the target user terminal; and send the encapsulated downstream Q-in-Q data packet through the egress port of the ARP entry of the IP address of the target user terminal.

In still another example, the removing unit 403 is further configured to remove a VXLAN encapsulation from a downstream VXLAN-encapsulated Ethernet data packet when the receiving unit 401 receives the downstream VXLAN-encapsulated Ethernet data packet.

The sending unit 402 is further configured to decapsulate the downstream Ethernet data packet into the downstream IP data packet when the destination MAC address of the downstream Ethernet data packet without the VXLAN encapsulation is determined to be the MAC address of the ESGW device, determine a matching ARP entry of the IP address of the target user terminal based on the destination IP address of the downstream IP data packet; encapsulate the downstream IP data packet into the downstream Q-in-Q data packet based on the ARP entry of the IP address of the target user terminal; and send the downstream Q-in-Q data packet through the egress port of the ARP entry of the IP address of the target user terminal.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of forwarding a packet, the method being applied to an Edge Stream Gateway (ESGW) device, comprising:
    in a case of receiving an upstream Q-in-Q protocol packet through a port connected to an access device,
        forwarding the upstream Q-in-Q protocol packet to a Virtual Broadband Remote Access Server (vBRAS) device through a Virtual eXtensible Local Area Network (VXLAN) tunnel between the ESGW device and the vBRAS device;
    in a case of receiving an upstream Q-in-Q data packet through a port connected to the access device, removing a Q-in-Q tag of the upstream Q-in-Q data packet,
determining that a destination Media Access Control (MAC) address of an upstream Ethernet data packet without the Q-in-Q tag is an MAC address of the ESGW device, and
performing layer-3 forwarding based on a destination Internet Protocol (IP) address of the upstream Ethernet data packet without the Q-in-Q tag.

2. The method according to claim 1, comprising:
querying an Access Control List (ACL) based on the upstream Q-in-Q protocol packet;
wherein a plurality of ACL entries is in the ACL,
an ingress port of a match field of each of the ACL entries is a port connected to the access device,
the match field of each of the ACL entries comprises a packet type identifier;
an instruction of each of the ACL entries is that: sending a packet through a tunnel port of a VXLAN tunnel connected to the vBRAS device,
priorities of the ACL entries are higher than a priority of an MAC entry; and
encapsulating the upstream Q-in-Q protocol packet into an upstream VXLAN-encapsulated Q-in-Q protocol packet by using a VXLAN tunnel through which the ESGW device is connected to the vBRAS device, based on the instruction of the ACL entry matching the upstream Q-in-Q protocol packet, and
sending the upstream VXLAN-encapsulated Q-in-Q protocol packet through an egress port of the VXLAN tunnel through which the ESGW device is connected to the vBRAS device.

3. The method according to claim 1, wherein performing layer-3 forwarding based on the destination IP address of the upstream Ethernet data packet comprises:
removing a destination MAC address and a source MAC address of the upstream Ethernet data packet;
obtaining an MAC address and a VXLAN tunnel corresponding to the destination IP address by searching for an Address Resolution Protocol (ARP) entry matching the destination IP address;
re-encapsulating the upstream Ethernet data packet by using the MAC address of the ESGW device as a source MAC address and the MAC address corresponding to the destination IP address as a destination MAC address, and encapsulating the re-encapsulated upstream Ethernet data packet into an upstream VXLAN-encapsulated Ethernet data packet based on the VXLAN tunnel corresponding to the destination IP address; and
sending the upstream VXLAN-encapsulated Ethernet data packet through an egress port of the VXLAN tunnel corresponding to the destination IP address.

4. The method according to claim 1, wherein performing layer-3 forwarding based on the destination IP address of the upstream Ethernet data packet comprises:
removing a destination MAC address and a source MAC address of the upstream Ethernet data packet;
searching for a next-hop IP address of the destination IP address;
obtaining an MAC address and an egress port corresponding to the next-hop IP address by searching for an ARP entry matching the next-hop IP address;
re-encapsulating the upstream Ethernet data packet by using the MAC address of the ESGW device as a source MAC address and an MAC address corresponding to the next-hop IP address as a destination MAC address, and sending the re-encapsulated upstream Ethernet data packet through an egress port corresponding to the next-hop IP address.

5. The method according to claim 1, further comprising receiving an IP address of a target user terminal, an MAC address of the target user terminal, an egress port reaching the target user terminal being a port connected to an access device, and a Q-in-Q tag of the target user terminal from the vBRAS device; and
generating an ARP entry of the IP address of the target user terminal; wherein the ARP entry of the IP address of the target user terminal records that the IP address of the target user terminal corresponds to the MAC address of the target user terminal, the port connected to the access device, and index information of the Q-in-Q tag of the target user terminal.

6. The method according to claim 5, further comprising:
receiving a downstream Ethernet data packet;
decapsulating the downstream Ethernet data packet into a downstream IP data packet in response to determining that a destination MAC address of the received downstream Ethernet data packet is the MAC address of the ESGW device;
determining a matching ARP entry of the IP address of the target user terminal based on a destination IP address of the downstream IP data packet;
encapsulating the downstream IP data packet into a downstream Q-in-Q data packet based on the ARP entry of the IP address of the target user terminal; and
sending the encapsulated downstream Q-in-Q data packet through an egress port of the ARP entry of the IP address of the target user terminal.

7. The method according to claim 5, further comprising:
receiving a downstream VXLAN-encapsulated Ethernet data packet and removing a VXLAN encapsulation from the downstream VXLAN-encapsulated Ethernet data packet; and
decapsulating the downstream Ethernet data packet into a downstream IP data packet in response to determining that a destination MAC address of the downstream Ethernet data packet without the VXLAN encapsulation is the MAC address of the ESGW device, and
determining a matching ARP entry of the IP address of the target user terminal based on a destination IP address of the downstream IP data packet;
encapsulating the downstream IP data packet into a downstream Q-in-Q data packet based on the ARP entry of the IP address of the target user terminal; and
sending the downstream Q-in-Q data packet through an egress port of the ARP entry of the IP address of the target user terminal.

8. An apparatus for forwarding a packet, the apparatus being applied to an Edge Stream gateway (ESGW) device, comprising:
a receiving unit configured to receive an upstream Q-in-Q protocol packet and an upstream Q-in-Q data packet through a port connected to an access device;
a removing unit configured to remove a Q-in-Q tag of the upstream Q-in-Q data packet when the receiving unit receives the upstream Q-in-Q data packet through a port connected to the access device; and
a sending unit configured to forward the upstream Q-in-Q protocol packet to a Virtual Broadband Remote Access Server (vBRAS) device through a Virtual eXtensible Local Area Network (VXLAN) tunnel between the ESGW device and the vBRAS device when the receiving unit receives the upstream Q-in-Q protocol packet through a port connected to the access device; and to perform layer-3 forwarding based on a destination Internet Protocol (IP) address of the upstream Ethernet data packet in response to determining that a destination Media Access Control (MAC) address of the upstream Ethernet data packet without the Q-in-Q tag is an MAC address of the ESGW device.

9. The apparatus according to claim 8, wherein
the sending unit is specifically configured to query an Access Control List (ACL) based on the upstream Q-in-Q protocol packet; wherein a plurality of ACL entries is in the ACL, an ingress port of a match field of each of the ACL entries is a port connected to the access device, the match field of each of the ACL entries comprises a packet type identifier; an instruction of each of the ACL entries is that: sending a packet through a tunnel port of a VXLAN tunnel connected to the vBRAS device, and priorities of the ACL entries are higher than a priority of an MAC entry; and
the sending unit is further configured to encapsulate the upstream Q-in-Q protocol packet into an upstream VXLAN-encapsulated Q-in-Q protocol packet by using a VXLAN tunnel through which the ESGW device is connected to the vBRAS device, based on the instruction of the ACL entry matching the upstream Q-in-Q protocol packet, and send the upstream VXLAN-encapsulated Q-in-Q protocol packet through an egress port of the VXLAN tunnel through which the ESGW device is connected to the vBRAS device.

10. The apparatus according to claim 8, wherein
the removing unit is further configured to remove a destination MAC address and a source MAC address of the upstream Ethernet data packet; and
the sending unit is further configured to obtain an MAC address and a VXLAN tunnel corresponding to the destination IP address by searching for an Address Resolution Protocol (ARP) entry matching the destination IP address; re-encapsulate the upstream Ethernet data packet by using the MAC address of the ESGW device as a source MAC address and the MAC address corresponding to the destination IP address as a destination MAC address, and encapsulate the re-encapsulated upstream Ethernet data packet into an upstream VXLAN-encapsulated Ethernet data packet based on the VXLAN tunnel corresponding to the destination IP address; and send the upstream VXLAN-encapsulated Ethernet data packet through the egress port of the VXLAN tunnel corresponding to the destination IP address.

11. The apparatus according to claim 8, wherein
the removing unit is further configured to remove a destination MAC address and a source MAC address of the upstream Ethernet data packet; and
the sending unit is further configured to search for a next-hop IP address of the destination IP address; obtain an MAC address and an egress port corresponding to the next-hop IP address by searching for an ARP entry matching the next-hop IP address; re-encapsulate the upstream Ethernet data packet by using the MAC address of the ESGW device as a source MAC address and an MAC address corresponding to the next-hop IP address as a destination MAC address, and send the re-encapsulated upstream Ethernet packet through an egress port corresponding to the next-hop IP address.

12. The apparatus according to claim 8, wherein
the receiving unit is specifically configured to receive an IP address of a target user terminal, an MAC address of the target user terminal, an egress port reaching the target user terminal being a port connected to the access device, and a Q-in-Q tag of the target user terminal from the vBRAS device; and
the apparatus further comprises:
a generating unit configured to generate an ARP entry of the IP address of the target user terminal; wherein the ARP entry of the IP address of the target user terminal records that the IP address of the target user terminal corresponds to the MAC address of the target user terminal, the port connected to the access device, and index information of the Q-in-Q tag of the target user terminal.

13. The apparatus according to claim 12, wherein
the sending unit is further configured to decapsulate a downstream Ethernet data packet into a downstream IP data packet in response to determining that the receiving unit receives the downstream Ethernet data packet and a destination MAC address of the received downstream Ethernet data packet is the MAC address of the ESGW device; determine a matching ARP entry of the IP address of the target user terminal based on a destination IP address of the downstream IP data packet; encapsulate the downstream IP data packet into a downstream Q-in-Q data packet based on the ARP entry of the IP address of the target user terminal; and send the encapsulated downstream Q-in-Q data packet through an egress port of the ARP entry of the IP address of the target user terminal.

14. The apparatus according to claim 12, wherein
the removing unit is further configured to remove a VXLAN encapsulation from a downstream VXLAN-encapsulated Ethernet data packet when the receiving unit receives the downstream VXLAN-encapsulated Ethernet data packet; and
the sending unit is further configured to decapsulate the downstream Ethernet data packet into a downstream IP data packet in response to determining that a destination MAC address of the downstream Ethernet data packet without the VXLAN encapsulation is the MAC address of the ESGW device; determine a matching ARP entry of the IP address of the target user terminal based on a destination IP address of the downstream IP data packet; encapsulate the downstream IP data packet into a downstream Q-in-Q data packet based on the ARP entry of the IP address of the target user terminal; and send the downstream Q-in-Q data packet through an egress port of the ARP entry of the IP address of the target user terminal.

15. An apparatus for forwarding a packet, the apparatus being applied to an Edge Stream gateway (ESGW) device, comprising:
a machine-readable storage medium storing machine-executable instructions; and
a processor in communication with the machine-readable storage medium; when executing the machine-executable instructions, the processor is caused to execute:
in a case of receiving an upstream Q-in-Q protocol packet through a port connected to an access device, forwarding the upstream Q-in-Q protocol packet to a Virtual Broadband Remote Access Server (vBRAS) device through a Virtual eXtensible Local Area Network (VXLAN) tunnel between the ESGW device and the vBRAS device;
in a case of receiving an upstream Q-in-Q data packet through a port connected to the access device, removing a Q-in-Q tag of the upstream Q-in-Q data packet, determining that a destination Media Access Control (MAC) address of an upstream Ethernet data packet without the Q-in-Q tag is an MAC address of the ESGW device, and performing layer-3 forwarding based on a destination Internet Protocol (IP) address of the upstream Ethernet data packet without the Q-in-Q tag.

16. The apparatus according to claim 15, wherein when executing the machine-executable instructions, the processor is further caused to execute:

querying an Access Control List (ACL) based on the upstream Q-in-Q protocol packet;

wherein a plurality of ACL entries is in the ACL an ingress port of a match field of each of the ACL entries is a port connected to the access device, the match field of each of the ACL entries comprises a packet type identifier;

an instruction of each of the ACL entries is that: sending a packet through a tunnel port of a VXLAN tunnel connected to the vBRAS device, priorities of the ACL entries are higher than a priority of an MAC entry; and encapsulating the upstream Q-in-Q protocol packet into an upstream VXLAN-encapsulated Q-in-Q protocol packet by using a VXLAN tunnel through which the ESGW device is connected to the vBRAS device, based on the instruction of the ACL entry matching the upstream Q-in-Q protocol packet, and sending the upstream VXLAN-encapsulated Q-in-Q protocol packet through an egress port of the VXLAN tunnel through which the ESGW device is connected to the vBRAS device.

17. The apparatus according to claim 15, wherein when executing the machine-executable instructions, the processor is further caused to execute:

removing a destination MAC address and a source MAC address of the upstream Ethernet data packet;

obtaining an MAC address and a VXLAN tunnel corresponding to the destination IP address by searching for an Address Resolution Protocol (ARP) entry matching the destination IP address;

re-encapsulating the upstream Ethernet data packet by using the MAC address of the ESGW device as a source MAC address and the MAC address corresponding to the destination IP address as a destination MAC address, and encapsulating the re-encapsulated upstream Ethernet data packet into an upstream VXLAN-encapsulated Ethernet data packet based on the VXLAN tunnel corresponding to the destination IP address; and sending the upstream VXLAN-encapsulated Ethernet data packet through an egress port of the VXLAN tunnel corresponding to the destination IP address.

18. The apparatus according to claim 15, wherein when executing the machine-executable instructions, the processor is further caused to execute:

removing a destination MAC address and a source MAC address of the upstream Ethernet data packet;

searching for a next-hop IP address of the destination IP address;

obtaining an MAC address and an egress port corresponding to the next-hop IP address by searching for an ARP entry matching the next-hop IP address;

re-encapsulating the upstream Ethernet data packet by using the MAC address of the ESGW device as a source MAC address and an MAC address corresponding to the next-hop IP address as a destination MAC address, and sending the re-encapsulated upstream Ethernet data packet through an egress port corresponding to the next-hop IP address.

19. The apparatus according to claim 15, wherein when executing the machine-executable instructions, the processor is further caused to execute:

receiving an IP address of a target user terminal, an MAC address of the target user terminal, an egress port reaching the target user terminal being a port connected to an access device, and a Q-in-Q tag of the target user terminal from the vBRAS device; and generating an ARP entry of the IP address of the target user terminal; wherein the ARP entry of the IP address of the target user terminal records that the IP address of the target user terminal corresponds to the MAC address of the target user terminal, the port connected to the access device, and index information of the Q-in-Q tag of the target user terminal.

20. The apparatus according to claim 15, wherein when executing the machine-executable instructions, the processor is further caused to execute:

receiving a downstream Ethernet data packet;

decapsulating the downstream Ethernet data packet into a downstream IP data packet in response to determining that a destination MAC address of the received downstream Ethernet data packet is the MAC address of the ESGW device;

determining a matching ARP entry of the IP address of the target user terminal based on a destination IP address of the downstream IP data packet;

encapsulating the downstream IP data packet into a downstream Q-in-Q data packet based on the ARP entry of the IP address of the target user terminal; and sending the encapsulated downstream Q-in-Q data packet through an egress port of the ARP entry of the IP address of the target user terminal.

* * * * *